(12) United States Patent
Kizaki et al.

(10) Patent No.: US 12,409,896 B2
(45) Date of Patent: Sep. 9, 2025

(54) LOWER VEHICLE-BODY STRUCTURE OF VEHICLE

(71) Applicant: MAZDA MOTOR CORPORATION, Hiroshima (JP)

(72) Inventors: Isamu Kizaki, Hiroshima (JP); Takuto Fukushima, Hiroshima (JP); Masanori Honda, Hiroshima (JP); Chikara Kawamura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 384 days.

(21) Appl. No.: 18/153,837

(22) Filed: Jan. 12, 2023

(65) Prior Publication Data

US 2023/0312019 A1   Oct. 5, 2023

(30) Foreign Application Priority Data

Apr. 5, 2022  (JP) .................................. 2022062967

(51) Int. Cl.
 *B62D 25/20*  (2006.01)
 *B62D 21/15*  (2006.01)
 *B62D 25/02*  (2006.01)

(52) U.S. Cl.
 CPC ......... *B62D 25/2036* (2013.01); *B62D 21/15* (2013.01); *B62D 21/157* (2013.01); *B62D 25/025* (2013.01)

(58) Field of Classification Search
 CPC .. B62D 25/025; B62D 25/2036; B62D 25/08; B62D 25/04; B62D 21/15; B62D 21/157
 USPC ....... 296/209, 187.12, 187.09, 187.1, 193.06
 See application file for complete search history.

(56) References Cited

U.S. PATENT DOCUMENTS

| | | | |
|---|---|---|---|
| 8,439,428 B2 * | 5/2013 | Imamura ............... | B62D 25/025 296/193.06 |
| 2008/0258503 A1 * | 10/2008 | Egawa ............... | B62D 25/2072 296/193.07 |
| 2008/0315629 A1 * | 12/2008 | Abe ....................... | B62D 35/02 296/193.07 |

FOREIGN PATENT DOCUMENTS

| | | | | |
|---|---|---|---|---|
| DE | 102015106812 B4 | * | 11/2018 | ............. B62D 25/04 |
| GB | 2497396 A | * | 6/2013 | ........... B62D 21/157 |
| JP | 2014-104832 A | | 6/2014 | |

OTHER PUBLICATIONS

DE102015106812 Text (Year: 2018).*
GB2497396 Text (Year: 2013).*

* cited by examiner

*Primary Examiner* — Dennis H Pedder
(74) *Attorney, Agent, or Firm* — Studebaker Brackett PLLC

(57) ABSTRACT

A lower vehicle-body structure of a vehicle is provided with a frame member having a closed-cross section. The frame member comprises a first portion and a second portion. The first portion comprises a compression face portion and a pair of side face portions. The side face portion comprises a bending portion, a compression-side area which is positioned on a side of the compression face portion relative to the bending portion and where a compressive stress is generated when the bending load is applied, and a tension-side area which is positioned on a side away from the compression face portion relative to the bending portion and where a tensile stress is generated when the bending load is applied. The compression-side area is configured to have higher rigidity than the tension-side area.

13 Claims, 8 Drawing Sheets

LOWER VEHICLE-BODY STRUCTURE OF VEHICLE

BACKGROUND OF THE INVENTION

The present invention relates to a lower vehicle-body structure of a vehicle.

Conventionally, a sectional structure (so-called full-use section or maximized-performance section) capable of compatibly attaining the bending strength and the impact absorption from viewpoints of the vehicle-weight reduction and the cost reduction has been required for a frame member of the lower vehicle-body structure of a vehicle, such as a side sill where a bending load is applied in a vehicle collision.

Japanese Patent Laid-Open Publication No. 2014-104832 discloses a structure of a side sill which comprises a bending portion for impact absorption. The side sill is a member having a closed-cross section structure extending in a vehicle longitudinal direction at each of both-side portions of the vehicle body, comprising two members of a side sill outer and a side sill inner. Each of the side sill outer and the side sill inner comprises a pair of flange portion, and the side sill outer and the side sill inner are joined together at the respective flange portions, thereby forming the above-described closed-cross section structure.

The side sill outer is a member having a sectional shape (hat-shaped sectional shape) which is formed by pressing a plate member with a uniform thickness, such as a steel plate. A pair of upper-and-lower side face portions of the side sill outer have bending portions which are bent toward an inside of the side sill, respectively. In a case where the vehicle has a side collision or the like, buckling of the side sill outer is caused with a starting point of the bending portion, so that the side sill outer can attain the impact absorption, maintaining a certain degree of bending strength of the side sill as a whole.

While the side sill is generally configured such that the flange portions of the side sill outer are located at the same position, in a vehicle width direction, of a lower end of a door, the flange portions of the side sill inner and the side sill outer may be possibly positioned on an outward side, in the vehicle width direction, of a sectional center of the side sill for securing a sufficient space in a cabin. In this case, since a sufficient width, in the vehicle width direction, of the side face portion of the side sill outer is not secured, the formability of the side face portion in pressing the side sill outer may be deteriorated. This deterioration of the formability may cause an angle of the bending portion to be improperly small, so that proper buckling of the side sill may not be generated. Accordingly, the above-described structure may be insufficient in attaining the proper impact absorption by securely generating the buckling of the side sill when the bending load is applied to the side sill in the vehicle collision.

SUMMARY OF THE INVENTION

The present invention has been devised in view of the above-described matters, and an object of the present invention is to provide a lower vehicle-body structure of a vehicle in which the frame member can attain the proper impact absorption by securely generating the buckling, suppressing its bending deformation, when the bending load is applied to the frame member in the vehicle collision.

The present invention is the lower vehicle-body structure of the vehicle which is provided with a frame member having a closed-cross section jointly formed by a first portion and a second portion which extend substantially in the same direction, wherein the first portion comprises a compression face portion where a compressive stress is generated when a bending load is applied to the frame member and a pair of side face portions which extend toward the second portion from both end portions of the compression face portion, each of the pair of side face portions comprises a bending portion which is formed by the side face portion bent toward an inside of the frame member, a compression-side area which is positioned on a side of the compression face portion relative to the bending portion and where a compressive stress is generated when the bending load is applied, and a tension-side area which is positioned on a side away from the compression face portion relative to the bending portion and where a tensile stress is generated when the bending load is applied, and the compression-side area is configured to have higher rigidity than the tension-side area against the bending load operative to compress the compression face portion.

In the above-described structure, the first portion of the first and second portions which form the closed-cross section of the frame member comprises the compression face portion where the compressive stress is generated when the bending load is applied to the frame member and the pair of side face portions extending toward the second portion from the both end portions of the compression face portion. The side face portion comprises the bending portion which is formed by the side face portion bent toward the inside of the frame member.

According to this structure, when the bending load is applied to the frame member in the vehicle collision, the compressive stress acts on the compression face portion of the first portion, so that the compression face portion is going to move toward the second portion. Further, the bending portions bent inwardly at the pair of side face portion of the first portion are going to move toward the inside of the frame member.

Moreover, in the above-described structure, the side face portion comprises the compression-side area positioned on the side of the compression face portion relative to the bending portion and the tension-side area positioned on the side away from the compression face portion relative to the bending portion, and the compression-side area is configured to have the higher rigidity than the tension-side area against the bending load operative to compress the compression face portion. Accordingly, when the vehicle has the collision, the tension-side area is tension-deformed toward the inside of the frame member in accordance with the bending portions moving toward the inside of the frame member and also the bending portions move toward the inside of the frame member, so that the buckling of the frame member can be generated. Herein, in the midway of the process of the moving of the bending portions toward the inside of the frame member, the compression-side area becomes a state where it is roughly parallel to the moving direction toward the second portion in the deformation process of the compression-side area having the high rigidity of each of the pair side face portions. Accordingly, since a large reaction force is generated against the bending load by the compression-side area, the bending deformation of the frame member can be suppressed. Consequently, the frame member can attain the proper impact absorption by securely generating the buckling, suppressing its bending deformation, when the bending load is applied to the frame member in the vehicle collision.

In the above-described lower vehicle-body structure, it is preferable that an angle between an extension line of the compression-side area and the tension-side area at said bending portion be set at 30 degrees or less.

According to this structure, even in a case where the bending portion is configured to have the small angle of 30 degrees or less as described above, since the tension-side area is configured to have the lower rigidity than the compression-side area, the tension-side area is tension-deformed toward the inside of the frame member and also the bending portions move toward the inside of the frame member, so that the buckling of the frame member can be securely generated.

In the above-described lower vehicle-body structure, it is preferable that a width of the compression-side area in a specified direction where the first portion and the second portion be arranged in a row be set at ¼ or less relative to a whole width of the frame member in the specified direction.

According to this structure, when the vehicle has the collision, the buckling of the frame member in the compression-side area of the side face portion of the first portion is suppressed and also the secure bending of the bending portion of the side face portion as a border between the compression-side area and the tension-side area of the side face portion becomes possible, so that the large reaction force can be generated at the side face portion.

In the above-described lower vehicle-body structure, the flowing configuration is preferable. That is, the frame member is a side sill which has a closed-cross section extending in a vehicle longitudinal direction at each of both-side portions of a vehicle body, the first portion is a side sill outer which comprises a pair of upper-and-lower flange portions and forms an outward side of said side sill in a vehicle width direction, the second portion is a side sill inner which comprises a pair of upper-and-lower flange portions and forms an inward side of the side sill in the vehicle width direction, the side sill is formed by the side sill outer and the side sill inner which are joined together at the respective flange portions, and the respective flange portions of the side sill outer and the side sill inner are arranged on an outward side, in the vehicle width direction, relative to a sectional center of the side sill.

According to this embodiment, since the respective flange portions of the side sill outer and the side sill inner which form the side sill are arranged on the outward side, in the vehicle width direction, relative to the sectional center of the side sill, the position of a door opening portion of the vehicle body which is partitioned by these flange portions can be easily located outwardly in the vehicle width direction, so that a cabin space can be secured properly. Accordingly, this structure can secure the sufficient cabin space properly, attaining suppressing of the bending deformation of the side sill and maintaining of the impact absorption performance.

In the above-described lower vehicle-body structure, it is preferable that the side sill further comprise a connecting plate portion which interconnects the pair of upper-and-lower flange portions of the side sill outer and the side sill inner in a state where the connecting plate portion is interposed between the respective pair of upper-and-lower flange portions of the side sill outer and the side sill inner.

According to this structure, the connecting plate portion interconnects the pair of upper-and-lower flange portions of the side sill outer and the side sill inner in the state where the connecting plate portion is interposed between the respective pair of upper-and-lower flange portions of the side sill outer and the side sill inner. Accordingly, even if the pair of upper-and-lower flange portions are going to move in a direction where these flange portions go away from each other in a vertical direction in the process of the bending deformation of the side sill in the vehicle collision, that vertical moving is suppressed by the connecting plate portion. Therefore, the secure buckling of the side sill at the bending portions can be attained.

In the above-described lower vehicle-body structure, it is preferable that the connecting plate portion be arranged at a part of the side sill, in the vehicle longitudinal direction, which forms the door opening portion of the vehicle body.

While the door opening portion of the vehicle body is an area with no pillar extending in the vertical direction where the support rigidity of the side sill is low, since the connecting plate portion is arranged at the part of the side sill which forms the door opening portion of the vehicle body as described above, the buckling of the side sill at the bending portions can be attained securely even in the area with no pillar.

In the above-described lower vehicle-body structure, it is preferable that the connecting plate portion be configured to have smaller bending strength than the side sill outer and the side sill inner.

The bending strength of the connecting plate portion is not required so much as the side sill outer and the side sill inner because a tensile load is applied to the connecting plate portion only such that the pair of upper-and-lower flange portions are pulled in the vertical direction in the vehicle collision. Therefore, the bending strength of the connecting plate portion can be set to be smaller than that of the side sill outer or the side sill inner, so that the connecting plate portion can be manufactured by using a thin and cheap material in addition to attaining the secure buckling of the side sill.

In the above-described lower vehicle-body structure, it is preferable that the compression-side area be formed by two sheets of plate members which are joined together.

According to this structure, since the compression-side area of the side face portion of the side sill outer is formed by the two sheets of plate members, the side sill capable of having the buckling can be easily manufactured by the two sheets of plate members joined together at the side sill outer.

In the above-described lower vehicle-body structure, the side sill outer may be configured such that a plate thickness of the compression-side area is larger than that of the tension-side area.

According to this structure, since the side sill outer is configured such that the plate thickness of the compression-side area is larger than that of the tension-side area, the side sill capable of having the buckling can be easily manufactured by integrally forming of the side sill outer itself.

In the above-described lower vehicle-body structure, it is preferable that the bending portions of the pair of side face portions be equidistance from the compression face portion.

According to this structure, when the bending load is applied to the frame member in the vehicle collision, the bending portions of the pair of side face portions can be moved inwardly at the same time, so that the side sill can securely have the buckling at the respective bending portions of the pair of side face portions.

As described above, according to the lower vehicle-body structure of the vehicle of the present invention, the frame member can attain the proper impact absorption by securely generating the buckling, suppressing its bending deformation, when the bending load is applied to the frame member in the vehicle collision.

The present invention will become apparent from the following description which refers to the accompanying drawings.

DETAILED DESCRIPTION OF THE INVENTION

Figure 1:
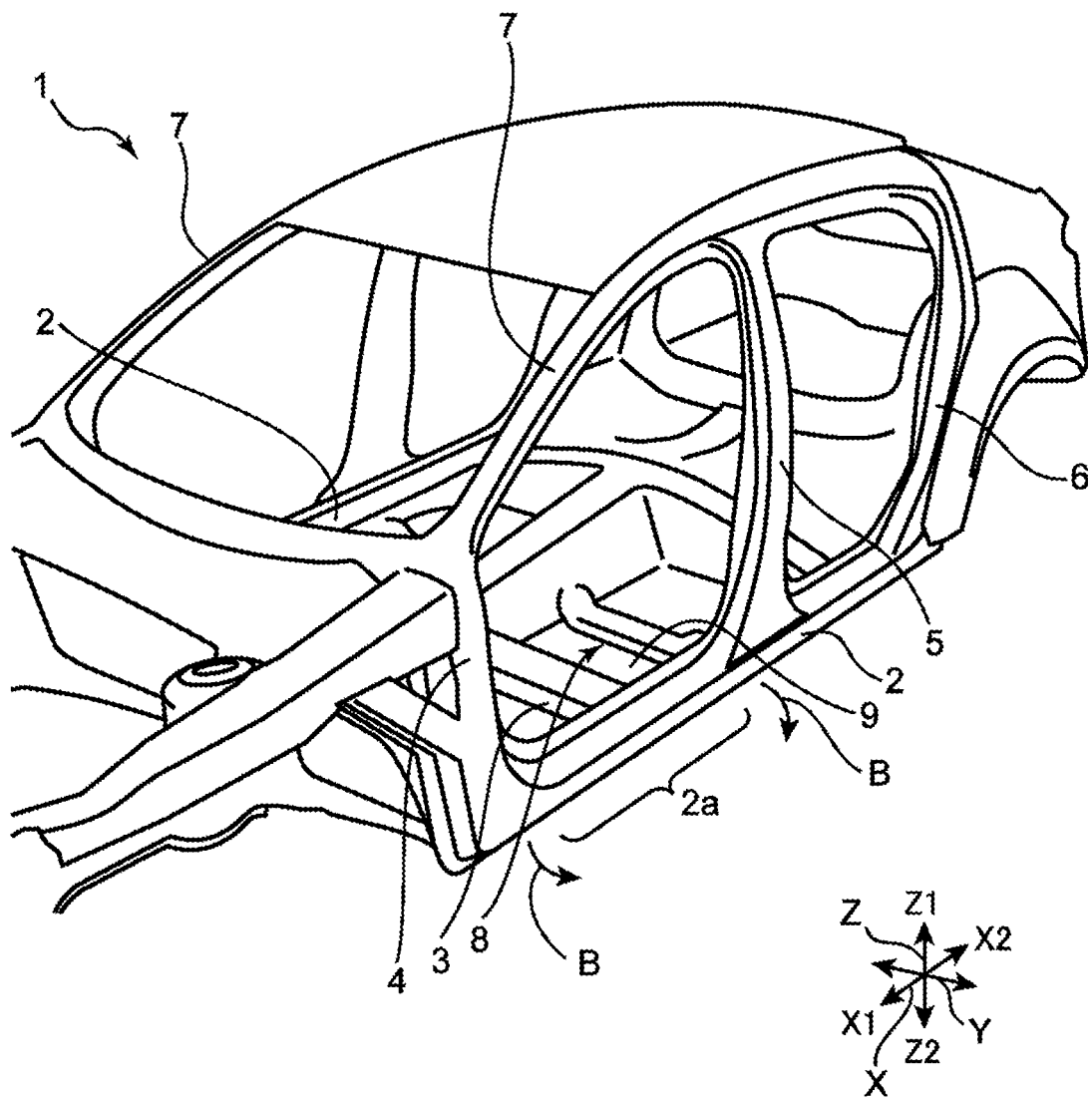
FIG. 1 is a perspective view showing a whole structure of a vehicle body provided with a lower vehicle-body structure of a vehicle according to an embodiment of the present invention.
Figure 2:
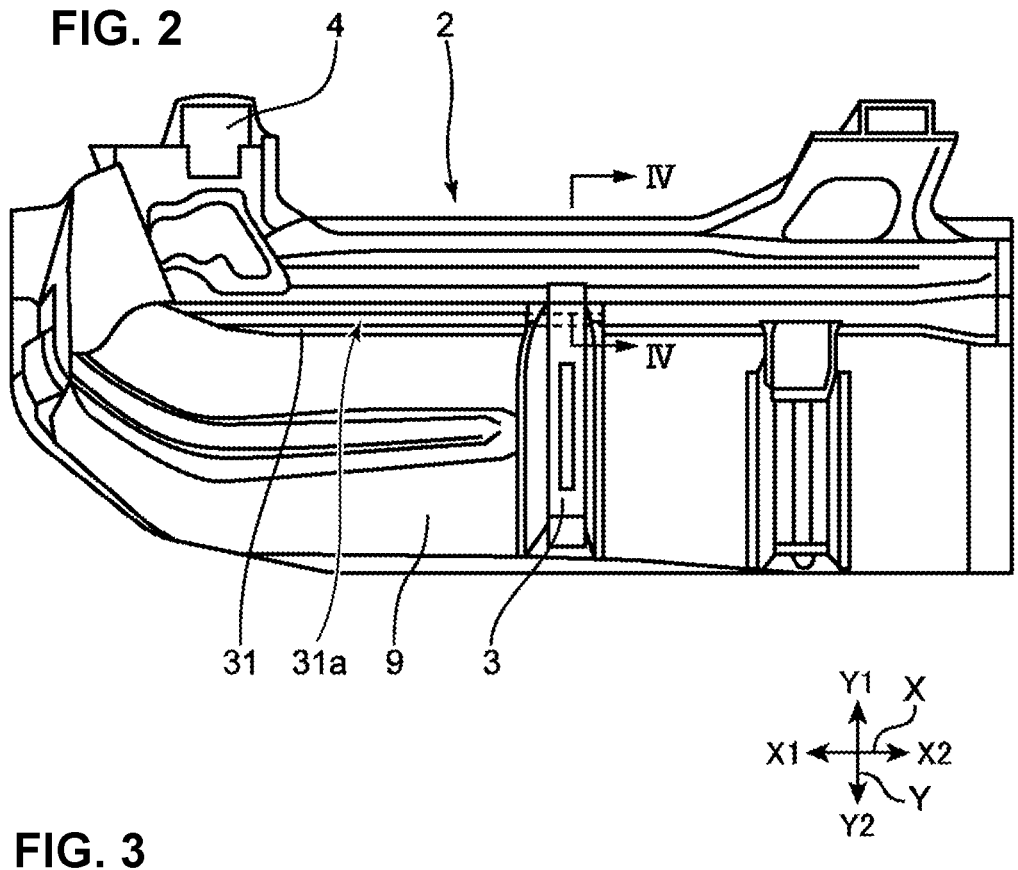
FIG. 2 is an enlarged plan view showing an arrangement of a side sill, a cross member, and a hinge pillar in FIG. 1.

Hereafter, a lower vehicle-body structure of a vehicle according to an embodiment of the present invention will be described specifically referring to the drawings.

As shown in FIGS. 1-4, a vehicle body 1 to which the lower vehicle-body structure of the vehicle according to the embodiment of the present invention is applied comprises, as frame members forming frames of the vehicle body 1, a pair of side sills 2 which extend in a vehicle longitudinal direction X at both sides, in a vehicle width direction Y, of the vehicle body 1 and a cross member 3 which extends in the vehicle width direction Y and interconnects the pair of side sills 2. Further, as other frame members, a hinge pillar 4, a center pillar 5, and a rear pillar 6 are provided to stand in order, in the vehicle longitudinal direction X, at intervals at each of both sides, in the vehicle width direction Y, of the vehicle body 1. The side sill 2 of the present embodiment extends in the vehicle longitudinal direction X between the hinge pillar 4 and the rear pillar 6. Further, a front pillar 7 which extends upwardly Z1 and rearwardly X2 toward an upper end of the center pillar 5 from an upper end of the hinge pillar 4 is provided. A door opening portion 8 at a vehicle front side is formed by these side sill 2, hinge pillar 4, center pillar 5, and front pillar 7. A door, not illustrated, is attached to the door opening portion 8 (specifically, a portion forming the door opening portion 8 at the hinge pillar 4) so as to open or close the door opening portion 8. Further, a floor panel 9 which forms a vehicle-body floor portion is provided between the pair of side sills 2 of the vehicle body 1.

Figure 4:
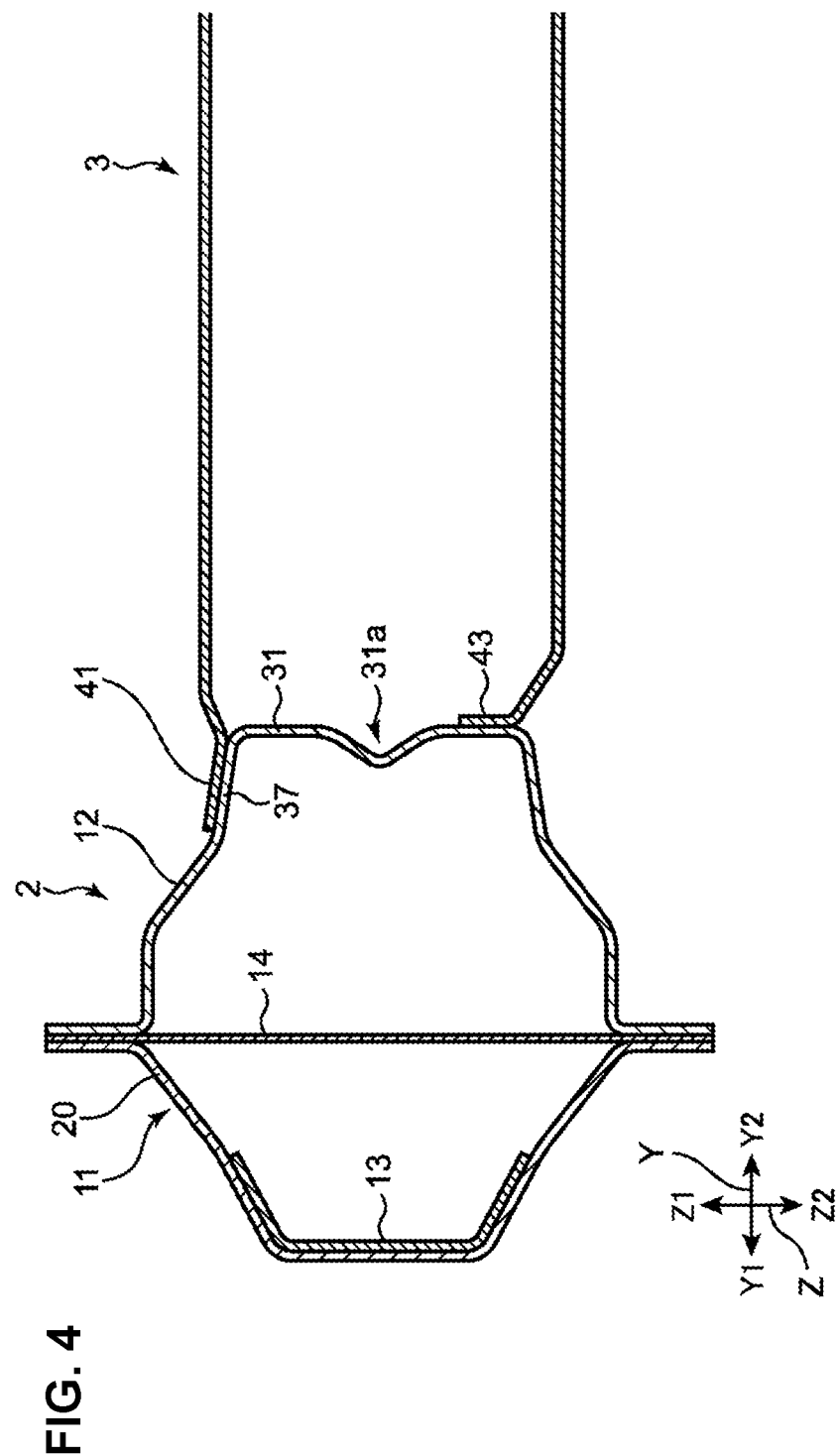
FIG. 4 is a sectional view taken along line IV-IV in FIG. 2.
Figure 5:
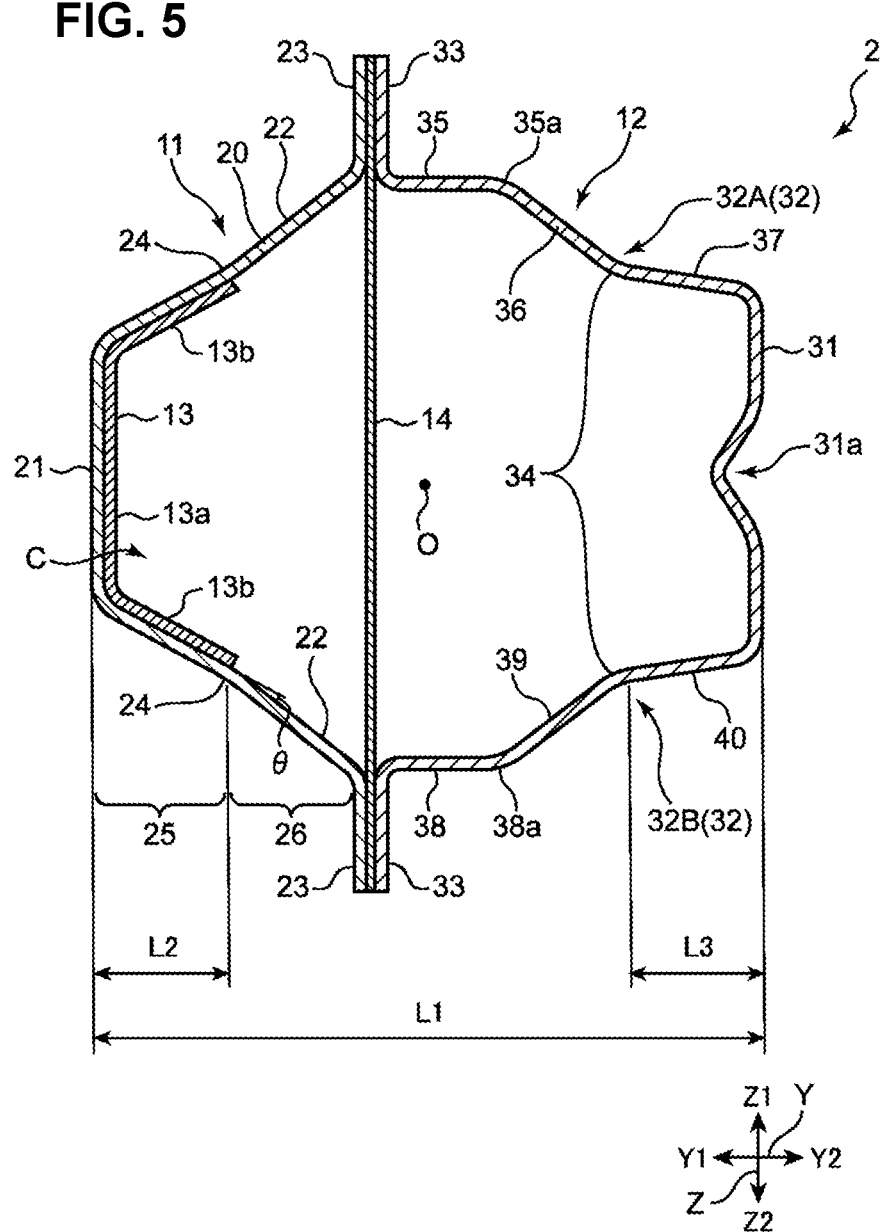
FIG. 5 is a sectional view of the side sill in FIG. 4.

As shown in FIGS. 4 and 5, the side sill 2 is a roughly cylindrical member which extends in the vehicle longitudinal direction X at the both-side portions of the vehicle body 1 and has a closed-cross section C, which comprises a pair of flange portions 23 and a pair of flange portions 33 which protrude upwardly Z1 and downwardly Z2, respectively.

The side sill 2 as the frame member of the vehicle body 1 comprises a side sill outer 11 as a first portion, a side sill inner 12 as a second portion which is positioned on an inward side Y2, in the vehicle width direction Y, of the side sill outer 11, and a connecting plate portion 14 which is interposed between the side sill outer 11 and the side sill inner 12.

The side sill outer 11 is formed by two sheets of plate members, such as steel plates (a main plate member 20 and a patch 13), and the side sill inner 12 and the connecting plate portion 14 are respectively formed by a sheet of plate member, such as the steel plate.

The side sill outer 11 comprises a pair of upper-and-lower flange portions 23 and constitutes a part of an outward side Y1, in the vehicle width direction, of the side sill 2. The side sill inner 12 comprises a pair of upper-and-lower flange portions 33 and constitutes a part of an inward side Y2, in the vehicle width direction, of the side sill 2.

The flange portions 23 of the side sill outer 11 and the flange portions 33 of the side sill inner 12 are joined together, thereby forming the side sill 2. That is, the closed-cross section C of the side sill 2 is formed together (specifically, joined) by the side sill outer 11 and the side sill inner 12 which extend in the same direction (the vehicle longitudinal direction X in the present embodiment).

Hereafter, the structure of the side sill outer 11 will be described more specifically. As shown in FIGS. 4 and 5, the side sill outer 11 of the present embodiment is formed by the two sheets of plate members, e.g., steel plates, of the main plate member 20 and the patch 13, which are joined together and then pressed in a shape having a hat-shaped cross section (i.e., a shape having the pair of flange portions 23).

The side sill outer 11 specifically comprises a compression face portion 21 which is a vertical wall extending in a vertical direction Z and where a compressive stress is generated when a bending load B to bend the side sill 2 inwardly (see FIG. 1) is applied to the side sill 2 in a vehicle side collision (when an obstacle or the like hits against a vehicle side from an outward side) or the like, a pair of side face portions 22 which extend toward the side sill inner 12, i.e., toward the inward side Y2, from both end portions of the compression face portion 21, expanding in the vertical direction Z, and the pair of flange portions 23 which extend toward an upward side Z1 and a downward side Z2, respectively, from respective ends of the inward sides Y2 of the pair of side face portions 22.

Each of the pair of side face portions 22 comprises a first bending portion 24 which is formed by the side face portion 22 which is bent toward an inside of the side sill 2, a compression-side area 25 which is positioned on a side of the compression face portion 21 relative to the first bending portion 24 and where a compressive stress is generated when the bending load B is applied, and a tension-side area 26 which is positioned on a side away from the compression face portion 21 relative to the first bending portion 24 and where a tensile stress is generated when the bending load B is applied. The first bending portion 24 corresponds to a bending portion of the present invention.

The first bending portion 24 is formed by the side face portion 22 being bent toward the inside of the side sill 2 (specifically, a portion of the main plate member 20 which corresponds to the side face portion 22).

The compression-side area 25 is configured to have higher rigidity than the tension-side area 26 against the bending load B to compress the compression face portion 21. In the present embodiment, the compression-side area 25 is formed by the two sheets of the plate members (the main plate member 20 and the patch 13) joined together. The patch 13 shown in FIG. 5 is joined to an inside of the main plate member 20. The patch 13 comprises a body portion 13a and a pair of both-side portions 13b which are formed by both-side portions of the body portion 13a which are bent. The body portion 13a is joined to the compression face portion 21, and the both-side portions 13b are joined to the compression-side area 25. A position of a tip of each of the both-side portions matches a position of the first bending portion 24. Thereby, the compression face portion 21 and the compression-side area of each of the side face portions 22 have high rigidity, whereas the tension-side area 26 where the patch 13 does not exist has low rigidity.

Further, the compression-side area 25 of the side face portion 22 of the present embodiment is formed by the main plate member 20 and the patch 13 which are joined together, whereas the tension-side area 26 is formed by the main plate member 20 only. Thereby, the rigidity of the side face portion 22 is configured to change discontinuously at the first bending portion 24 as a border. In other words, while the compression-side area 25 and the tension-side area 26 of the present embodiment have the constant rigidity in their respective areas, the side face portion 22 is configured such that the rigidity of the compression-side area 25 and the rigidity of the tension-side area 26 substantially change from each other at the first bending portion 25.

While the patch 13 can be joined to either face of the outward side Y1 and the inward side Y2 of the main plate member 20, the outward side Y1 face is preferable because the compression-side area 25 may not be easily crushed (deformed) in the vehicle collision.

Since the rigidity of the side face portion 22 of the present embodiment is configured to change discontinuously at the first bending portion 24 as the border as described above, the side sill 2 easily has the buckling at the first bending portion 24 when the bending load B is applied to the side sill 2 in the vehicle collision. Accordingly, even if an angle θ of the first bending portion 24 between an extension line of the compression-side area 25 and the tension-side area 26 is set at 30 degrees or less as shown in FIG. 5, the buckling of the side sill 2 can be attained securely.

Next, the structure of the side sill inner 12 will be described specifically. As shown in FIGS. 4 and 5, the side sill inner 12 is formed by a single sheet of plate member, e.g., steel plate, which is pressed in a shape having a hat-shaped cross section (i.e., a shape having the pair of flange portions 33).

The side sill inner 12 specifically comprises a tension face portion 31 which is a vertical wall extending in the vertical direction Z and where a tensile stress is generated when the bending load B (see FIG. 1) is applied to the side sill 2, a pair of side face portions 32 (i.e., an upper-side side face portion 32A and a lower-side side face portion 32B) which extend toward the side sill outer 11, i.e., toward the outward side Y1, from both end portions of the tension face portion 31, expanding in the vertical direction Z, and the pair of flange portions 33 which extend toward the upward side Z1 and the downward side Z2, respectively, from respective ends of the outward sides Y1 of the pair of side face portions 32.

Figure 3:
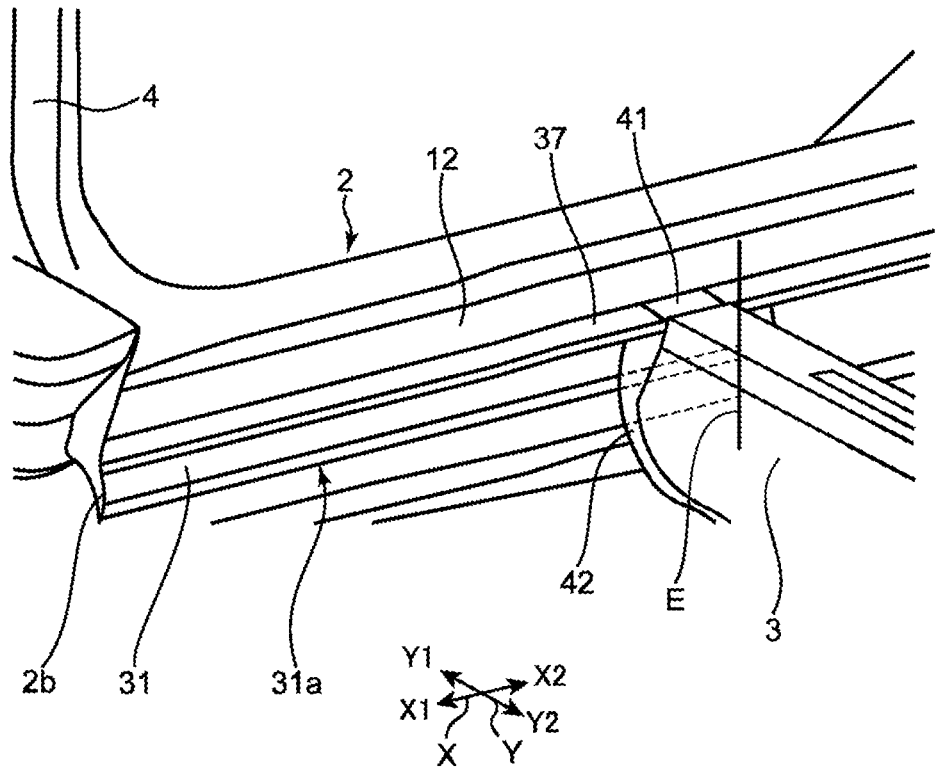
FIG. 3 is an enlarged perspective view showing the arrangement of the side sill, the cross member, and the hinge pillar in FIG. 1.

As shown in FIGS. 3 and 5, a bead 31a to reinforce the side sill inner 12 is provided to extend in an extension direction of the side sill inner 12 (i.e., in the vehicle longitudinal direction X) is formed at a middle portion, in the vertical direction Z, of the tension face portion 31. The bead 31a is formed by recessing a part of the middle portion of the tension face portion 31 inwardly (toward the outward side Y1). As shown in FIG. 3, the bead 31a of the present embodiment extends from an end portion 2b of a forward side X1 of the side sill 2 (a connection portion of the hinge pillar 4) up to a position E of an end portion of a rearward side X2.

The pair of side face portions 32 (the upper-side side face portion 32A and the lower-side face portion 32B) comprises respective second bending portions 34 which are bent toward the inside of the side sill 2 and respective two faces which extend in the vehicle width direction Y (see faces 35, 37, 38, 40 shown in FIG. 5). That is, the side face portion 32 has a roughly step-shaped cross section having two steps.

Specifically, the upper-side side face portion 32A of the pair of side face portions 32 comprises a first upper face portion 35 which extends in the vehicle width direction Y, an upper-side slant face portion 36 which extends obliquely toward the inward side Y2 and the downward side Z2 from an end portion 35a of the inward side Y2 of the first upper face portion 35, and a second upper face portion 37 which extends toward the inward side Y2 from an end portion of the inward side Y2 of the upper-side slant portion 36, forming the second bending portion 34.

Further, the lower-side side face portion 32B comprises a first lower face portion 38 which extends in the vehicle width direction Y at a position vertically away from the first upper face portion 35, a lower-side slant face portion 39 which extends obliquely toward the inward side Y2 and the upward side Z1 from an end portion 38a of the inward side Y2 of the first lower face portion 38, and a second lower face portion 40 which extends toward the inward side Y2 from an end portion of the inward side Y2 of the lower-side slant portion 39, forming the second bending portion 34. The lower-side side face portion 32B is linearly symmetrical to the upper-side side face portion 32A. Accordingly, in the vehicle width direction Y, the first lower face portion 38 has the same width as the first upper face portion 35, the lower-side slant face portion 39 has the same width and slant angle as the upper-side slant face portion 36, and the second lower face portion 40 has the same width as the second upper face portion 37.

That is, the side sill inner 12 is configured to have the pair of upper-and-lower bending portions 34 which are respectively bent toward the inside of the cross section of the side sill 2 at a point between the second upper face portion 37 and the upper-side slant portion 36 and anther point between the second lower face portion 40 and the lower-side slant portion 39.

The tension face portion 31 extends in the vertical direction Z and interconnects respective end portions of the inward side Y2 of the second upper face portion 37 and the second lower face portion 40.

As shown in FIGS. 3 and 4, an end portion of the cross member 3 extending in the vehicle width direction Y is joined to the side sill inner 12. The cross member 3 has three flange portions, a first flange portion 41, a second flange portion 42, and a third flange portion 43 at its end portion. The first flange portion 41 extends toward the outward side Y1 from an upper face of the cross member 3 and is joined to a second upper face portion 37 of the side sill inner 12. The second flange portion 42 extends in the vehicle longitudinal direction X from an end edge of the outward side Y1 of a side face (a face directed toward the vehicle longitudinal direction X) of the cross member 3 toward the outward side Y1 from an upper face of the cross member 3 and is joined to a second upper face portion 37 of the side sill inner 12.

The third flange portion 43 extends toward the upward side Z1 (i.e., toward an inside of the cross member 3) from an end edge of the outward side Y1 of a bottom wall portion of the cross member 3 and is joined to the tension face portion 31.

As shown in FIG. 5, the side sill 2 of the present embodiment is configured such that a width L2 of the compression-side area 25 in a specified direction (the vehicle width direction Y) where the side sill outer 11 and the side sill inner 12 are arranged in a row is set at ¼ or less relative to a whole width L1 of the side sill 2 in the specified direction. Thereby, when the bending load B is applied in the vehicle side collision or the like, the side sill 2 can have the buckling securely at the first bending portions 24.

Further, as shown in FIG. 5, since a width L3 of the second upper face portion 37 and the second lower face portion 40 in the specified direction (the vehicle width direction Y) where the side sill outer 11 and the side sill inner 12 are arranged in a row is set at ¼ or less relative to the whole width L1 of the side sill 2 in the specified direction (the vehicle width direction Y), the side sill 2 can have the buckling securely at the second bending portions 34, suppressing buckling at the second upper face portion 37 and the second lower face 40, when the bending load B is applied in the vehicle side collision or the like.

Further, as show in FIG. 5, while the respective flange portions 23, 33 (particularly, the flange portions 23, 33 which protrude upwardly Z1) of the side sill outer 11 and the side sill inner 12 become a standard position of the door opening portion 8 in FIG. 1, a sufficient cabin space can be secured because the above-described flange portions are arranged on the outward side Y1 of a sectional center O of the side sill 2.

As shown in FIGS. 4 and 5, the connecting plate portion 14 interconnects the pair of upper-and-lower flange portions 23, 33 of the side sill outer 11 and the side sill inner 12 in a state where the connecting plate portion 14 is interposed between the respective pair of upper-and-lower flange portions 23, 33 of the side sill outer 11 and the side sill inner 12.

While the connecting plate portion 14 can be located at any position in the vehicle longitudinal direction X as long as it is located inside the side sill 2, it is preferable that the connecting plate portion 14 be arranged as shown in FIG. 1 so as to promote the buckling at a portion 2a of the side sill 2 which forms the door opening portion 8 of the vehicle body 1 in the vehicle longitudinal direction X by reinforcing this portion 2a.

The connecting plate portion 14 is configured to have smaller bending strength than the side sill outer 11 and the side sill inner 12. Specifically, the connecting plate portion 14 is made of a plate member having a smaller thickness than the main plate member 20 and the patch 13 which forms the side sill outer 11 and the side sill inner 12.

The first bending portions 24 of the pair of side face portions 22 are provided to be equidistance from the compression face portion 21. That is, the both first bending portions 24 of the side sill outer 11 are positioned vertically symmetrically.

(Deformation Process of Side Sill 2)

Subsequently, the deformation process of the side sill 2 when the bending load B is applied to the side sill 2 in the vehicle side collision will be described referring to FIGS. 6A-6D.

Figure 6A:
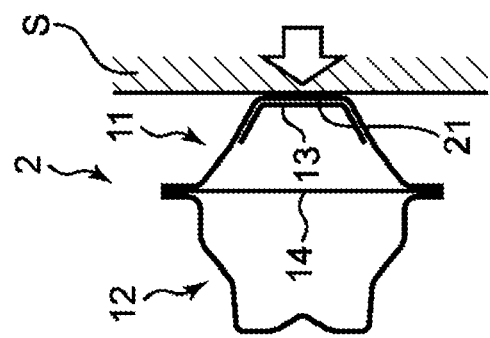
FIGS. 6A-6D are sectional explanatory diagrams showing a deformation process of the side sill in a vehicle side collision.

In the vehicle side collision, i.e., when an obstacle S hits against the side sill 2 from the outward side Y1 toward the inward side Y2 in the vehicle width direction Y, a collision load is applied to the side sill 2 from the side as shown in FIG. 6A. Thereby, the bending load B to bend the side sill 2 toward vehicle inward side is inputted to the side sill 2 which is fixed at both sides, in the vehicle longitudinal direction X, thereof by vehicle-body structural members, such as the hinge pillar 4 and the center pillar 5 as shown in FIG. 1.

Figure 6B:
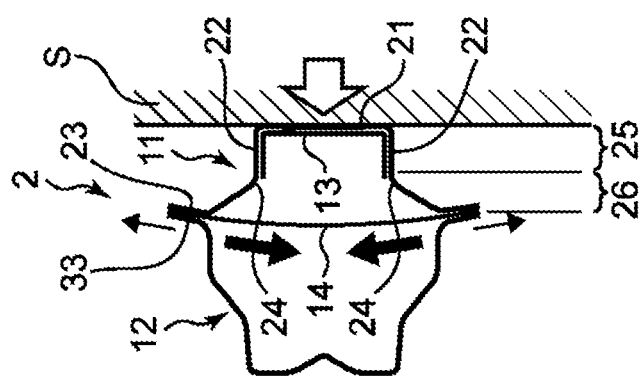

As shown in FIG. 6B, in an initial stage of the vehicle side collision, when the compressive stress acts on the compression face portion 21 of the side sill outer 11 of the side sill 2, the compression face portion 21 is going to move toward the side sill inner 12 (the inward side Y2), and also the compressive stress acts on the compression-side area 25 and the tensile stress acts on the tension-side area 26 at the pair of side face portions 22 of the side sill outer 11. Since the compression-side area 25 having the patch 13 has the higher rigidity than the tension-side area 26, moving of the first bending portions 24 toward the inside of the side sill 2 is promoted (induced) even if the first bending portions 24 have the small angle (30 degrees or less).

The tension-side area 26 is tension-deformed toward the inside of the side sill 2 in accordance with the above-described moving of the first bending portions 24 toward the inside of the side sill 2, so that the buckling is generated at the side sill 2. Herein, in the midway of the process of the moving of the first bending portions 24 toward the inside of the side sill 2, the compression-side areas 25 having the high rigidity become a state where they are roughly parallel to the direction of the collision load (i.e., the moving direction of the compression face portion 21 toward the side sill inner 12, specifically, the vehicle width direction Y) in the deformation process. Thereby, a large reaction force against the bending load B is generated by the compression-side area 25. Further, in this compression state, the connecting plate portion 14 suppresses the upper-and lower flanges 23, 33 of the side sill 2 from moving in a direction where these flange portions 23, 33 go away from each other in the vertical direction, so that the large reaction force against the bending load B is generated.

Figure 7:
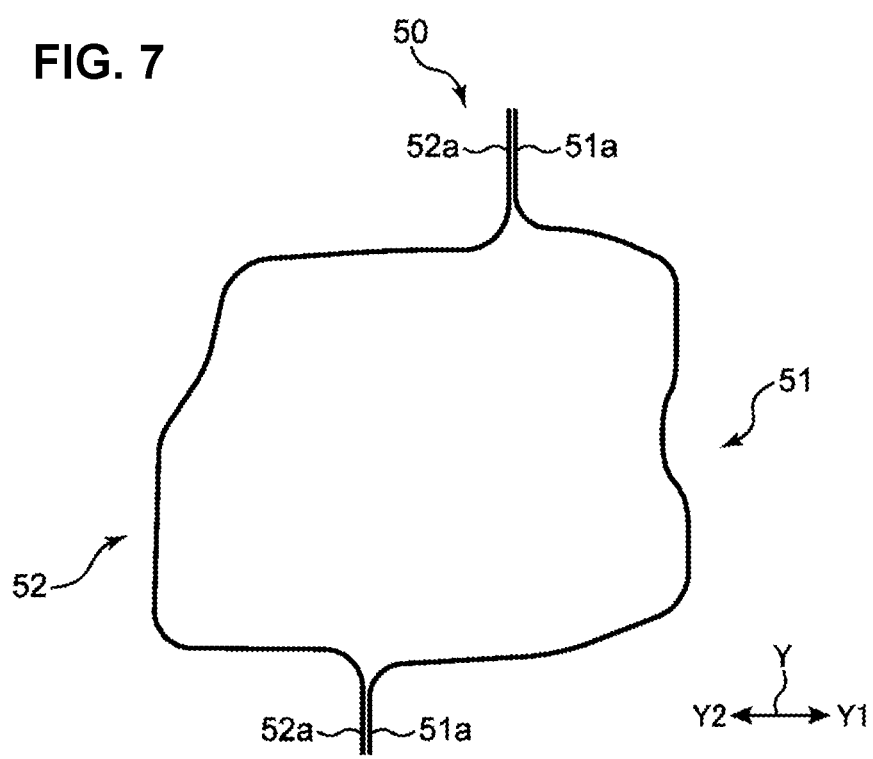
FIG. 7 is a sectional view of a general side sill as a comparative example of the present invention.
Figure 8:
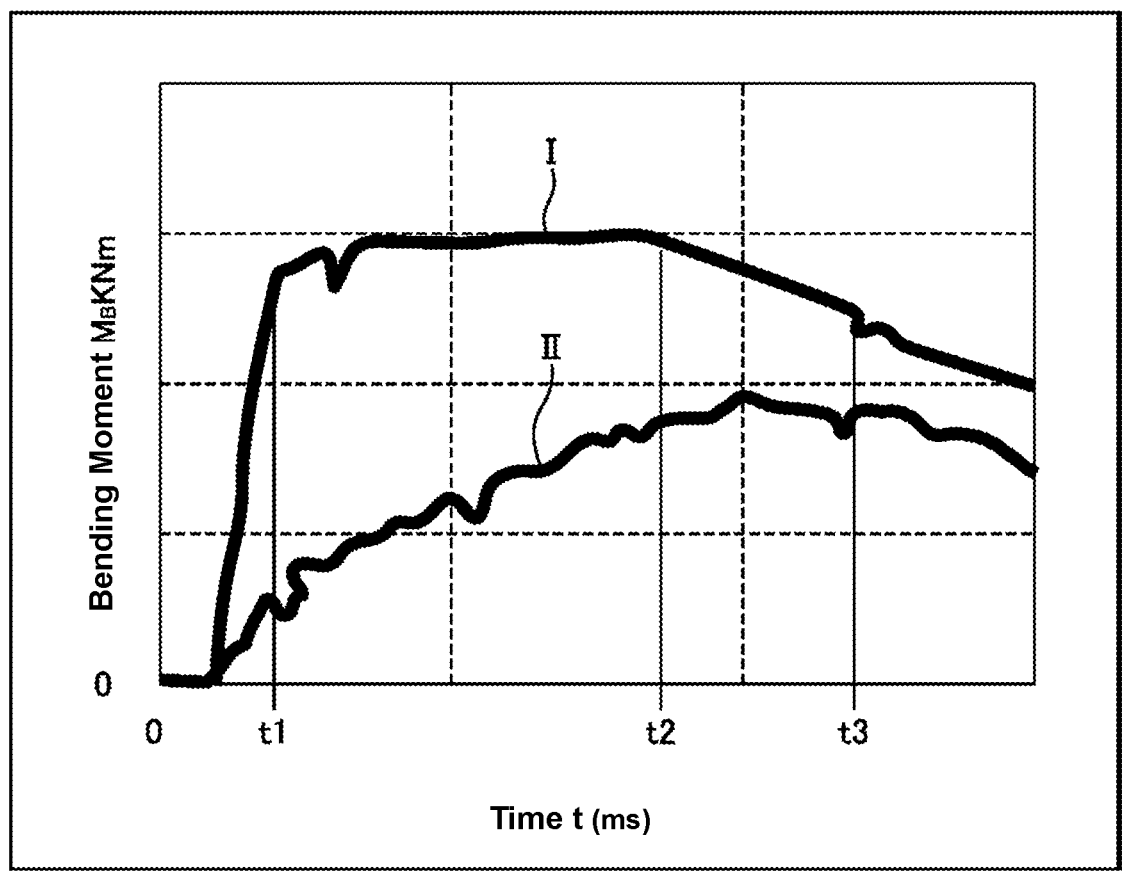
FIG. 8 is a graph showing time changes of respective bending moments of the present embodiment and the comparative example.

The above-described reaction force is apparent from a graph of FIG. 8 in which a bending moment MB rises at the time t1 in a curve I. The graph of FIG. 8 shows a time change of the bending moment MB which is generated at the side sill as the reaction force. The curve I of FIG. 8 shows the time change of the bending moment generated at the side sill 2 of the present embodiment, whereas a curve II shows a time change of a bending moment generated at a conventional side sill 50 which is shown in FIG. 7 as a comparative example. Herein, the conventional side sill 50 shown in FIG. 7 is formed by a side sill outer 51 and a side sill inner 52 which have the same plate thickness, wherein a pair of flange portions 51a of the side sill outer 51 and a pair of flange portions 52a of the side sill inner 52 are joined together. The side sill 50 does not have any bending portion like the first bending portions 24 or the second bending portions 34 of the present embodiment which cause the buckling.

The state shown in FIG. 6B of the present embodiment corresponds to the time t1 in the graph shown in FIG. 8, when the curve I shows that the large bending moment as the reaction force of the side sill 2 is generated. Meanwhile, the curve II at the time t1 shows that the small bending moment as the reaction force of the conventional side sill 50 is generated.

Figure 6C:
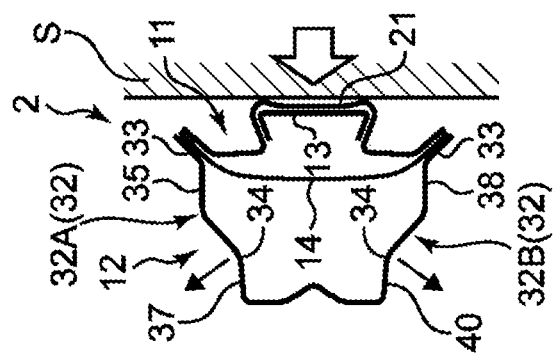

In a state shown in FIG. 6C where the time has passed further from the start of the vehicle side collision, deformation of the side sill inner 12 also progresses together with the deformation of the side sill outer 11. In the process of the deformation of the side sill inner 12, respective end portions (a pair of flange portions 33 and their surrounding portions) of the outward side Y1 of the pair of side face portions 32 (the upper-side side face portion 32A and the lower-side side face portion 32B) of the side sill inner 12 are extended upwardly Z1 and the downwardly Z2, respectively, so that the side sill inner 12 is going to be deformed such that the first and second upper face portions 35, 37 and the first and second lower face portions 38, 40 protrude toward the outside of the cross section of the side sill 2. At the same time, since the respective second bending portions 34 of the pair of side face portions 32 of the side sill inner 12 are going to be deformed toward the outside of the cross section of the side sill 2, the first and second upper face portions 35, 37 and the first and second lower face portions 38, 40 can keep their roughly-parallel state to the direction of the side-collision load (i.e., the moving direction of the compression face portion 21 toward the side sill inner 12, specifically, the vehicle width direction Y). Accordingly, the first and second upper face portions 35, 37 and the first and second lower face portions 38, 40 of the side sill inner 12 can support the side sill outer 11 which is under process of the deformation and generate the larger reaction force, so that the bending deformation of the side sill 2 can be properly suppressed.

The above-described reaction force of the side sill inner 12 is also apparent from the large bending moment at the time t2 in the curve I of the graph of FIG. 8. That is, when the side sill 2 of the present embodiment has the state shown in FIG. 6C, which corresponds to the time t2 in the graph of FIG. 8, the curve I shows a state where the large bending moment as the reaction force of the side sill 2 is maintained. Thus, it is apparent from the curve I that the buckling of the side sill 2 toward the inward side Y2 can be suppressed effectively and the reaction force of the side sill 2 can be maintained because not only the side sill outer 11 has the first bending portions 24 but also the side sill inner 12 has the second bending portions 34.

Meanwhile, the state of the curve II at the time t2 shows that the bending moment as the reaction force of the conventional side sill 50 does not reach the bending moment of the curve I.

Figure 6D:
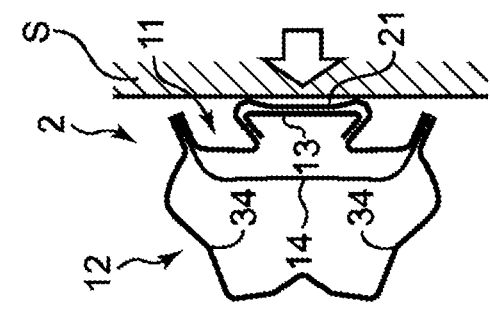

Further, in a state where the time has passed further from the start of the vehicle side collision as shown in FIG. 6D, the side sill inner 12 is more deformed such that the second bending portions 34 move outwardly and the side sill inner 12 protrudes outwardly, so that the reaction force is generated.

The state of the side sill 2 shown in FIG. 6D of the present embodiment corresponds to the time t3 in the graph shown in FIG. 8. It is apparent from FIG. 8 that the bending moment as the reaction force of the side sill 2 at the time t3 in the curve I is going down, but its reaction force is still kept at a sufficiently higher level than the reaction force of the conventional side sill 50 shown in the curve II.

(Regarding Torsion of Side Sill 2)

In the above-described explanation, the reaction force as the bending moment of the side sill 2 when the bending load B is applied to the side sill 2 in the vehicle side collision has been referred to regarding the bending deformation of the side sill 2. However, since the side sill 2 of the present embodiment comprises the first bending portions 24 and the second bending portions 34, the larger reaction force can be generated even in a case where a torsional moment around an axis extending in the vehicle longitudinal direction X is applied.

Figure 9:
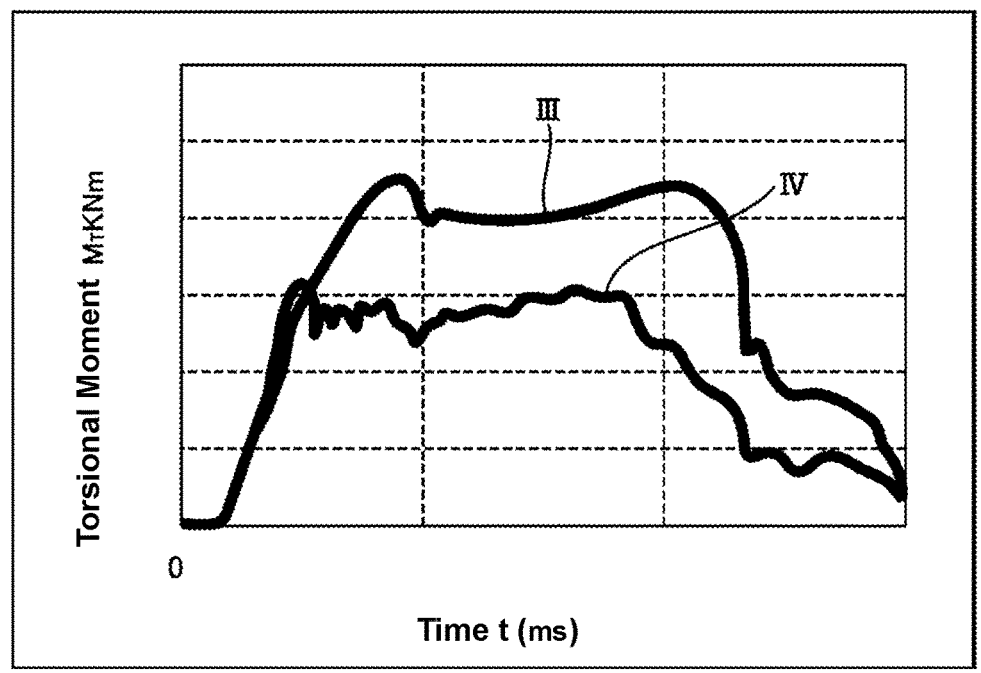
FIG. 9 is a graph showing time changes of respective torsional moments of the present embodiment and the comparative example.

In a graph of FIG. 9, a time change of a torsional moment MT as the reaction force of the side sill 2 of the present embodiment is shown by a curve III, whereas a time change of a torsional moment MT of the conventional side sill 50 of FIG. 7 is shown by a curve IV. As apparent from the graph of FIG. 9, the side sill 2 of the present embodiment (the curve III) and the conventional side sill 50 (the curve IV) generate substantially the equal level of torsional moment as the reaction force in an initial stage when the torsional moment starts to be applied, but after this timing the side sill 2 of the present embodiment keeps the larger torsional moment than the conventional side sill 50 as the reaction force.

(Features of Present Embodiment)

(1)

In the structure in which the width measure of the pair of upper-and-lower side face portions 22 of the side sill outer 11 which forms the closed-cross section C of the side sill 2 in cooperation with the side sill inner 12 is not secured, the lower vehicle-body structure of the present embodiment is configured such that in order to securely generate the buckling at the side sill 2 by moving the first bending portions 24 of the pair of side face portions 22 in the vehicle side collision toward the inside of the cross section, each of the side face portions 22 of the side sill outer 11 has the rigidity difference at the first bending portion 24 such that the compression-side area 25 has the higher rigidity, thereby securely generating the side sill 2 at these first bending portions 24.

That is, as shown in FIG. 5, the side sill outer 11 comprises the compression face portion 21 where the compressive stress is generated when the bending load B is applied to the side sill 2 and the pair of side face portions 22 which extend toward the side sill inner 12 from the both end portions of the compression face portion 21. Each of the pair of side face portions 22 comprises the first bending portion 24 which is formed by the side face portion 22 bent toward the inside of the side sill 2.

According to this structure, when the bending load B is applied to the side sill 2 in the vehicle collision, as shown in FIG. 6B, the compressive stress acts on the compression face portion 21 of the side sill outer 11, so that the compression face portion 21 is going to move toward the side sill inner 12. Further, the first bending portions 24 bent inwardly at the pair of side face portion 22 of the side sill outer 11 are going to move toward the inside of the side sill 2.

Further, in the structure of the side sill outer 11, each of the side face portions 22 further comprises the compression-side area 25 which is positioned on the side of the compression face portion 21 relative to the first bending portion 24 and the tension-side area 26 which is positioned on the side away from the compression face portion 21 relative to the first bending portion 24, and the compression-side area 25 is configured to have the higher rigidity than the tension-side area 26 against the bending load B operative to compress the compression face portion 21. In other words, the rigidity of the side face portion 22 is configured to change discontinuously at the first bending portion 24 as the border from the rigidity of the compression-side area 25 to the rigidity of the tension-side area 26. Accordingly, when the vehicle has the collision, as shown in FIG. 6B, the tension-side area 26 is tension-deformed toward the inside of the side sill 2 in accordance with the first bending portions 24 moving toward the inside of the side sill 2 and also the first bending portions 24 move toward the inside of the side sill 2, so that the buckling of the side sill 2 can be generated. Herein, in the midway of the process of the moving of the first bending portions 24 toward the inside of the side sill 2, the compression-side area 25 becomes the state where it is roughly parallel to the moving direction toward the side sill inner 12 in the deformation process of the compression-side area 25 having the high rigidity of each of the pair side face portions 22. Accordingly, since the large reaction force is generated against the bending load B by the compression-side area 25, the bending deformation of the side sill 2 can be suppressed. Consequently, the side sill 2 can attain the proper impact absorption by securely generating the buckling, suppressing its bending deformation, when the bending load B is applied to the side frame 2 in the vehicle collision.

(2)

In the lower vehicle-body structure of the present embodiment, the angle θ between the extension line of the compression-side area 25 and the tension-side area 26 at the first bending portion 24 is set at 30 degrees or less. According to this structure, even in a case where the first bending portion 24 is configured to have the small angle θ of 30 degrees or less as described above, since the tension-side area 26 is configured to have the lower rigidity than the compression-side area 25, the tension-side area 26 is tension-deformed toward the inside of the side sill 2 and also the first bending portions 24 move toward the inside of the side sill 2, so that the buckling of the side sill 2 can be securely generated.

That is, even in a case where the angle θ of the first bending portion 24 of the side sill outer 11 cannot be secured sufficiently in the structure in which the width measure of the pair of upper-and-lower side face portions 22 of the side sill outer 11 is not secured, the first bending portions 24 of the pair of the side face portions 22 move toward the inside of the side sill 2 in the vehicle side collision, thereby generating the buckling at the side sill 2 securely (3)

In the lower vehicle-body structure of the present embodiment, the width L2 of the compression-side area 25 in the specified direction (the vehicle width direction Y) where the side sill outer 11 and the side sill inner 12 are arranged in a row is set at ¼ or less relative to the whole width L1 of the side sill 2 in the specified direction (the vehicle width direction Y).

According to this structure, when the vehicle has the collision, the buckling of the side sill 2 in the compression-side area 25 of the side face portion 22 of the side sill outer 11 is suppressed and also the secure bending of the first bending portion 24 of the side face portion 22 as the border between the compression-side area 25 and the tension-side area 26 of the side face portion 22 becomes possible, so that the large reaction force can be generated at the side face portion 22.

Figure 10:
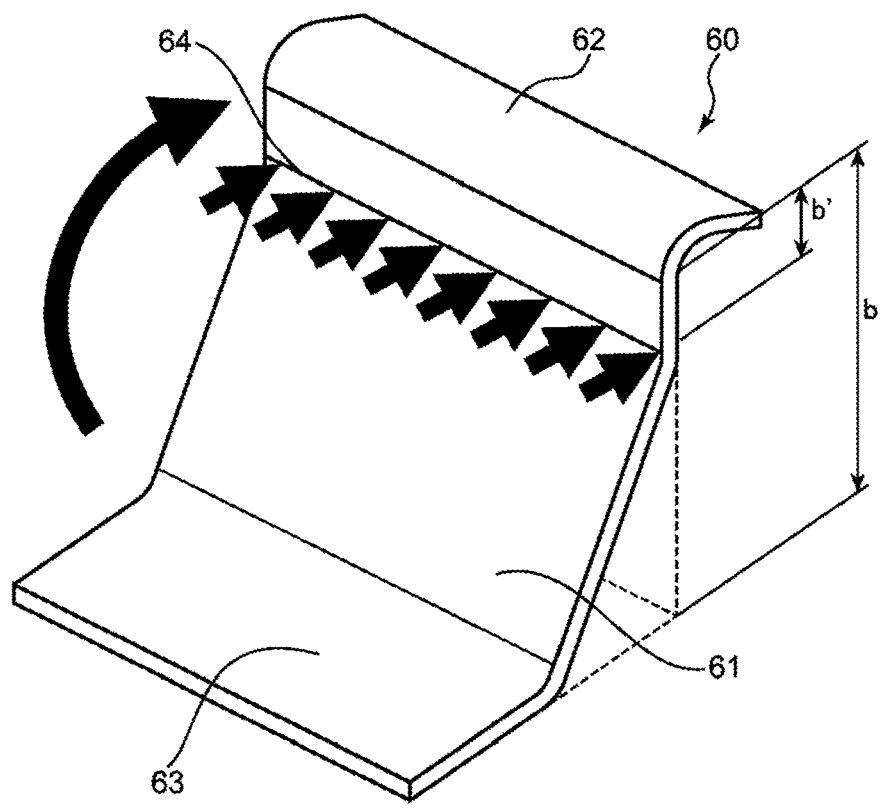
FIG. 10 is a diagram showing a vertical plate for testing regarding a position of a bending portion.
Figure 11:
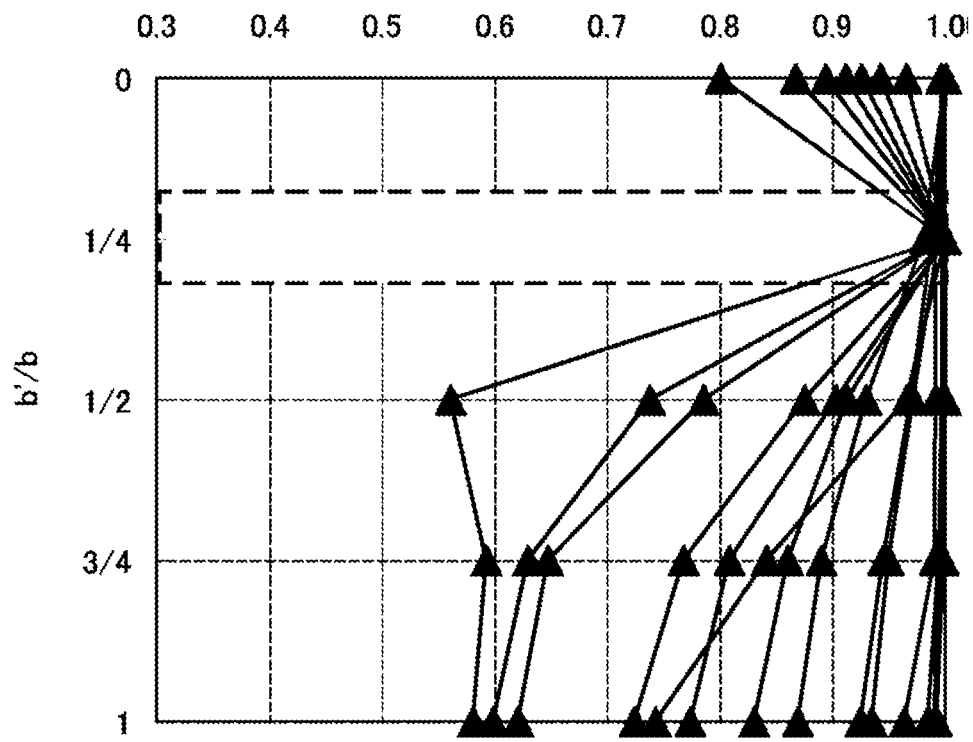
FIG. 11 is a graph showing changes of buckling-resistance ratios in a case where a ratio of a distance between an upper end of the vertical plate and the bending portion relative to a whole height of the vertical plate is changed.

Herein, the best position, in the whole width of the side sill, of the bending portion to promote the buckling will be studied referring to FIGS. 10 and 11. First, as shown in FIG. 10, a portion of the whole width, in the vehicle width direction, of the side sill is considered as a model of a single vertical plate 61. Upper-and-lower end portions of the vertical plate 61 are restrained by being connected to end plates 62, 63.

It can be considered that the bending portion 64 as a shape changing point (i.e., a buckling point of the vertical plate 61) is provided at the vertical plate 61 for approaching an all plastic moment as an all potential which the vertical plate 61 has originally, i.e., an index of the ideal buckling resistance of the vertical plate 61. Herein, by using the model where the vertical plate 61 has buckling at the bending portion 64 and is bent when a vertical-directional bending load is applied to the vertical plate 61 as shown in FIG. 10, a buckling-resistance ratio R, which may become a criteria of the magnitude of a reaction force of the vertical plate 61 in which the bending portion 64 is provided at a position which is distance b' away from the upper end of the vertical plate 61 having a whole height b, has been obtained by computer simulation. As a result, as shown by a graph of FIG. 11 which shows a relationship between a ratio b/b' of the distance b' to the whole height b of the vertical plate 61 and the buckling-resistance ratio R (a ratio to the ideal buckling resistance), it has been found that the buckling resistance shows its largest magnitude in a case where the bending portion 64 is provided at a position located at ¼ of the whole height b of the vertical plate 61.

It can be considered from the above-described results that the buckling resistance increases the most when the first bending portion 24 of the side sill 2 is ¼×L1 away from the compression face portion 21 (L1=the whole width of the side sill 2). Based on the above-described studies, the following results can be obtained. That is, by setting the width L2 of the compression-side area 25 at ¼ or less relative to the whole width L1 of the side sill 2 in the specified direction (the vehicle width direction Y), the buckling of the side sill 2 in the compression-side area 25 can be properly suppressed and also the bending of the side face portions 22 at the first bending portions 24 as the border between the compression-side area 25 and the tension-side area 26 can be bent, so that the large reaction force can be generated at the side face portions 22.

(4)

In the lower vehicle-body structure of the present embodiment, the frame member is the side sill 2 which has the closed-cross section C extending in the vehicle longitudinal direction X at each of the both-side portions of the vehicle body 1. The first portion is the side sill outer 11 which comprises the pair of upper-and-lower flange portions 23 and forms the portion of the outward side Y1 of said side sill 2 in the vehicle width direction Y, the second portion is the side sill inner 12 which comprises the pair of upper-and-lower flange portions 33 and forms the portion of the inward side Y2 of the side sill 2 in the vehicle width direction Y. The side sill 2 is formed by the side sill outer 11 and the side sill inner 12 which are joined together at the respective flange portions 23, 33.

According to the structure of the present embodiment, since the respective flange portions 23, 33 of the side sill outer 11 and the side sill inner 12 which form the side sill 2 are arranged on the outward side Y1, in the vehicle width direction Y, relative to the sectional center O of the side sill 2 as shown in FIG. 5, the position of the door opening portion 8 of the vehicle body 1 which is partitioned by these flange portions 23, 33 can be easily located outwardly Y1 in the vehicle width direction Y, so that a cabin space can be secured properly. Accordingly, this structure can secure the sufficient cabin space properly, attaining suppressing of the bending deformation of the side sill 2 and maintaining of the impact absorption performance.

(5)

In the lower vehicle-body structure of the present embodiment, the side sill 2 further comprises the connecting plate portion 14. The connecting plate portion 14 interconnects the pair of upper-and-lower flange portions 23, 33 of the side sill outer 11 and the side sill inner 12 in the state where the connecting plate portion 14 is interposed between the respective pair of upper-and-lower flange portions 23, 33 of the side sill outer 11 and the side sill inner 12. Accordingly, even if the pair of upper-and-lower flange portions 23, 33 are going to move in the direction where these flange portions 23, 33 go away from each other in the vertical direction Z in the process of the bending deformation of the side sill 2 in the vehicle collision, that vertical moving is suppressed by the connecting plate portion 14. Therefore, the secure buckling of the side sill 2 at the first bending portions 24 can be attained.

(6)

In the lower vehicle-body structure of the present embodiment, the connecting plate portion 14 is arranged at the part 2a (see FIG. 1) of the side sill 2, in the vehicle longitudinal direction X, which forms the door opening portion 8 of the vehicle body 1. While the door opening portion 8 of the vehicle body 1 is the area with no pillar extending in the vertical direction Z where the support rigidity of the side sill 2 is low, since the connecting plate portion 14 is arranged at the part 2a of the side sill 2 which forms the door opening portion 8 of the vehicle body 1 as described above, the buckling of the side sill 2 at the first bending portions 24 can be attained securely even in the area with no pillar.

(7)

In the lower vehicle-body structure of the present embodiment, the connecting plate portion 14 is configured to have the smaller bending strength than the side sill outer 11 and the side sill inner 12. The bending strength of the connecting plate portion 14 is not required so much as the side sill outer 11 and the side sill inner 12 because the tensile load is applied to the connecting plate portion 14 only such that the pair of upper-and-lower flange portions 23, 33 are pulled in the vertical direction in the vehicle collision. Therefore, the bending strength of the connecting plate portion 14 can be set to be smaller than that of the side sill outer 11 or the side sill inner 12, so that the connecting plate portion 14 can be manufactured by using a thin and cheap material in addition to attaining the secure buckling of the side sill 2.

(8)

In the lower vehicle-body structure of the present embodiment, the compression-side area 25 of the side sill outer 11 is formed by two sheets of plate members, i.e., the main plate member 20 and the patch 13 which are joined together. According to this structure, since the compression-side area 25 of the side face portion 22 of the side sill outer 11 is formed by the two sheets of plate members, the side sill 2 capable of having the buckling can be easily manufactured by the two sheets of plate members joined together at the side sill outer 11.

(9)

In the lower vehicle-body structure of the present embodiment, the first bending portions 24 of the pair of side face portions 22 of the side sill outer 11 are equidistance from the compression face portion 21. According to this structure, when the bending load B is applied to the side sill 2 in the vehicle collision, the first bending portions 24 of the pair of side face portions 22 can be moved inwardly at the same time, so that the side sill 2 can securely have the buckling at the respective first bending portions 24 of the pair of side face portions 22.

Modified Examples (A)

While the compression-side area 25 of the side sill outer 11 of the above-described embodiment is formed by the two sheets of plate members, i.e., the main plate member 20 and the patch 13 which are joined together, the present invention is not limited to this. In a case where the side sill outer 11 is formed by a shingle sheet of plate member, the plate thickness of the compression-side area 25 may be set to be larger than that of the tension-side area 26. In this structure, the side sill 2 capable of having the buckling can be easily manufactured by integrally forming the side sill outer 11 itself.

(B)

While the closed-cross section C of the side sill 2 of the above-described embodiment is formed by joining the side sill outer 11 as the first portion and the side sill inner 12 as the second portion which are different members from each other, the present invention is not limited to this. The side sill may be configured such that the side sill outer and the side sill inner which correspond to the first portion and the second portion, respectively, are integrally formed. In this case, the same functions and effects as those of the side sill 2 of the above-described embodiment can be obtained as well.

(C)

While the side sill 2 is exemplified as the frame member applied to the present invention in the above-described embodiment, the present invention is not limited to this. Any member of frame members which constitute the vehicle body is applicable as long as the bending load is applied to this member in the vehicle collision. For example, the frame members of the present invention include not only the side sill but also the cross member 3 extending in the vehicle width direction Y, a dash cross member, a floor frame, and a rear frame. For example, in a case of the cross member 3, an upper face of a member (an upper member) which forms an upper side of the cross member 3 becomes the compression-side portion, and a pair of portions which extend downwardly from both end portions, in the vehicle longitudinal direction, of this upper face become the pair of side face portions.

What is claimed is:

1. A lower vehicle-body structure of a vehicle which is provided with a frame member having a closed-cross section jointly formed by a first portion and a second portion which extend substantially in the same direction, wherein said first portion comprises a compression face portion where a compressive stress is generated when a bending load is applied to said frame member and a pair of side face portions which extend toward said second portion from both end portions of said compression face portion, each of said pair of side face portions comprises a bending portion where the side face portion is bent toward an inside of the frame member when viewed from the compression face portion toward the second portion, a compression-side area which is positioned on a side of said compression face portion relative to said bending portion and where a compressive stress is generated when said bending load is applied, and a tension-side area which is positioned on a side away from said compression face portion relative to said bending portion and where a tensile stress is generated when said bending load is applied, and said compression-side area is configured to have higher rigidity than said tension-side area for said bending load operative to compress said compression face portion.

2. The lower vehicle-body structure of the vehicle of claim 1, wherein an angle between an extension line of said compression-side area and said tension-side area at said bending portion is set at 30 degrees or less.

3. The lower vehicle-body structure of the vehicle of claim 2, wherein a width of said compression-side area in a specified direction where said first portion and said second portion are arranged in a row is set at ¼ or less relative to a whole width of said frame member in said specified direction.

4. The lower vehicle-body structure of the vehicle of claim 3, wherein said frame member is a side sill which has a closed-cross section extending in a vehicle longitudinal direction at each of both-side portions of a vehicle body, said first portion is a side sill outer which comprises a pair of upper-and-lower flange portions and forms an outward side of said side sill in a vehicle width direction, said second portion is a side sill inner which comprises a pair of upper-and-lower flange portions and forms an inward side of said side sill in the vehicle width direction, said side sill is formed by said side sill outer and said side sill inner which are joined together at the respective flange portions, and said respective flange portions of the side sill outer and the side sill inner are arranged on an outward side, in the vehicle width direction, relative to a sectional center of said side sill.

5. The lower vehicle-body structure of the vehicle of claim 4, wherein said side sill further comprises a connecting plate portion which interconnects said pair of upper-and-lower flange portions of the side sill outer and the side sill inner in a state where the connecting plate portion is interposed between the respective pair of upper-and-lower flange portions of the side sill outer and the side sill inner.

6. The lower vehicle-body structure of the vehicle of claim 5, wherein said connecting plate portion is arranged at a part of said side sill, in the vehicle longitudinal direction, which forms a door opening portion of the vehicle body.

7. The lower vehicle-body structure of the vehicle of claim 6, wherein said connecting plate portion is configured to have smaller bending strength than said side sill outer and said side sill inner.

8. The lower vehicle-body structure of the vehicle of claim 6, wherein said compression-side area is formed by two sheets of plate members which are joined together.

9. The lower vehicle-body structure of the vehicle of claim 6, wherein said side sill outer is configured such that a plate thickness of said compression-side area is larger than that of said tension-side area.

10. The lower vehicle-body structure of the vehicle of claim 6, wherein said bending portions of the pair of side face portions are equidistance from said compression face portion.

11. The lower vehicle-body structure of the vehicle of claim 1, wherein said compression-side area is formed by two sheets of plate members which are joined together.

12. The lower vehicle-body structure of the vehicle of claim 1, wherein said side sill outer is configured such that a plate thickness of said compression-side area is larger than that of said tension-side area.

13. The lower vehicle-body structure of the vehicle of claim 1, wherein said bending portions of the pair of side face portions are equidistance from said compression face portion.

* * * * *